March 23, 1943. R. L. GOFF 2,314,697
MEAT CHOPPING BLOCK SMOOTHING MACHINE
Filed Oct. 28, 1940 3 Sheets-Sheet 1
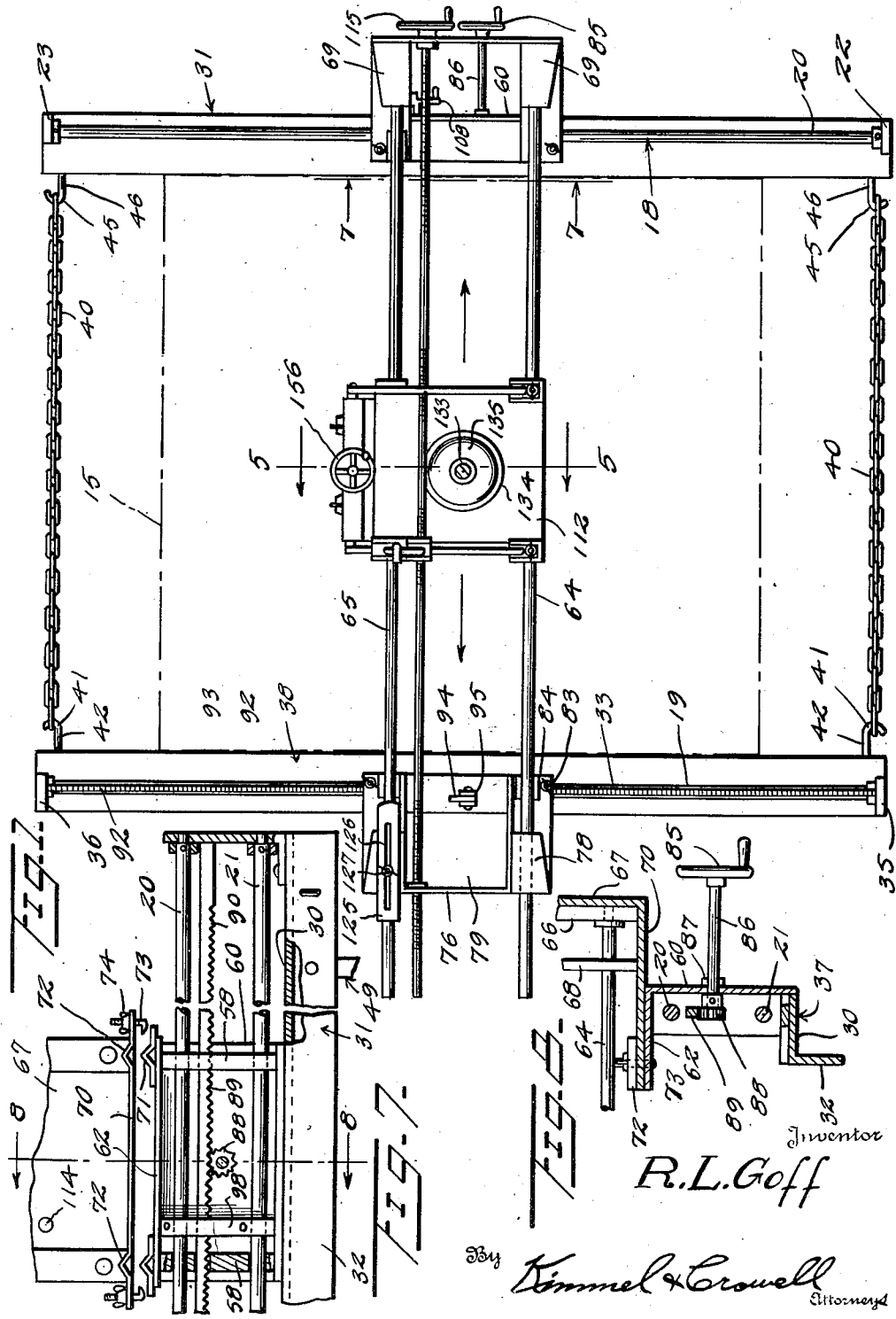
Inventor
R. L. Goff
By Kimmel & Crowell
Attorneys March 23, 1943.　　　R. L. GOFF　　　2,314,697
MEAT CHOPPING BLOCK SMOOTHING MACHINE
Filed Oct. 28, 1940　　　3 Sheets-Sheet 2
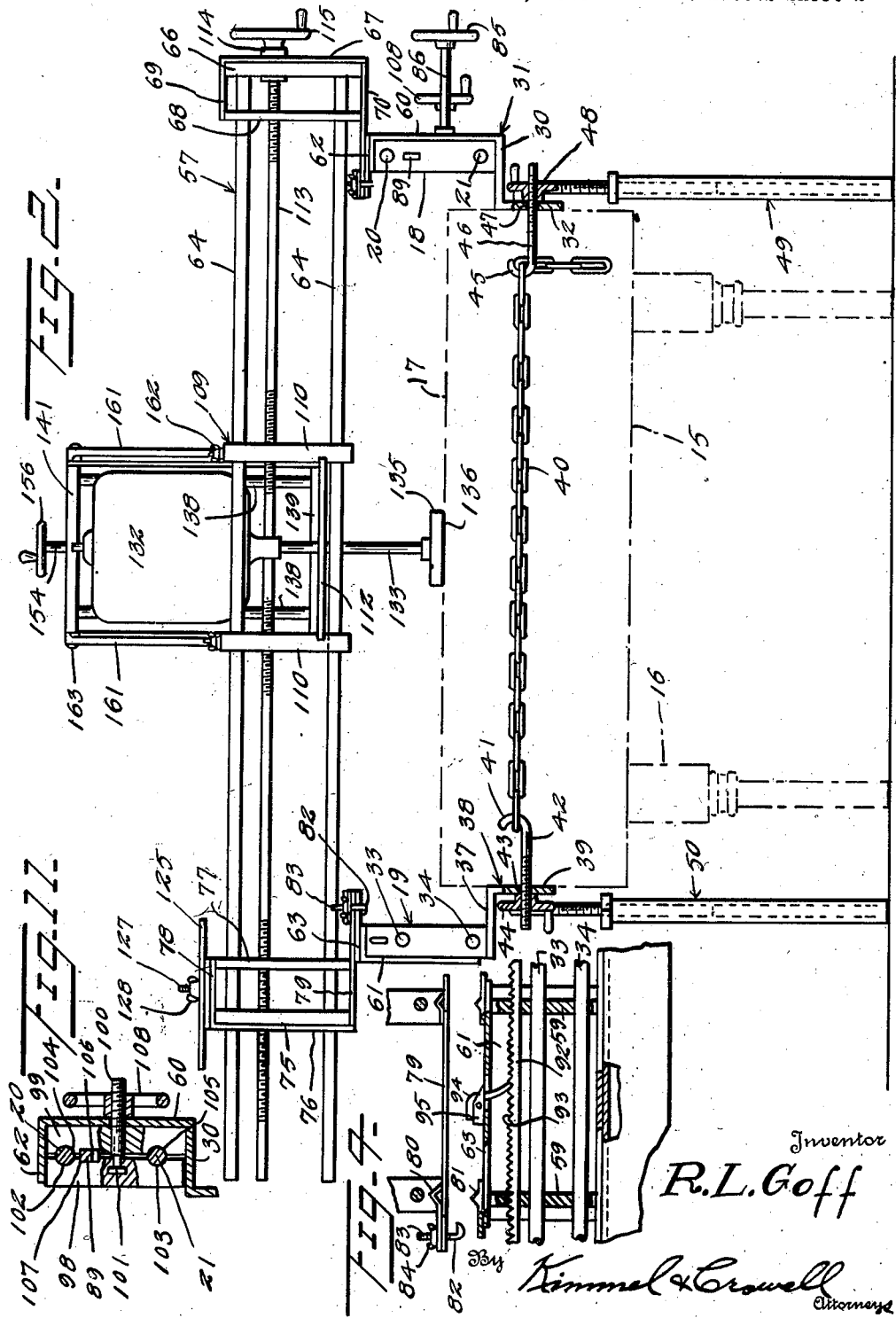
Inventor
R.L.Goff
By Kimmel & Crowell
Attorneys

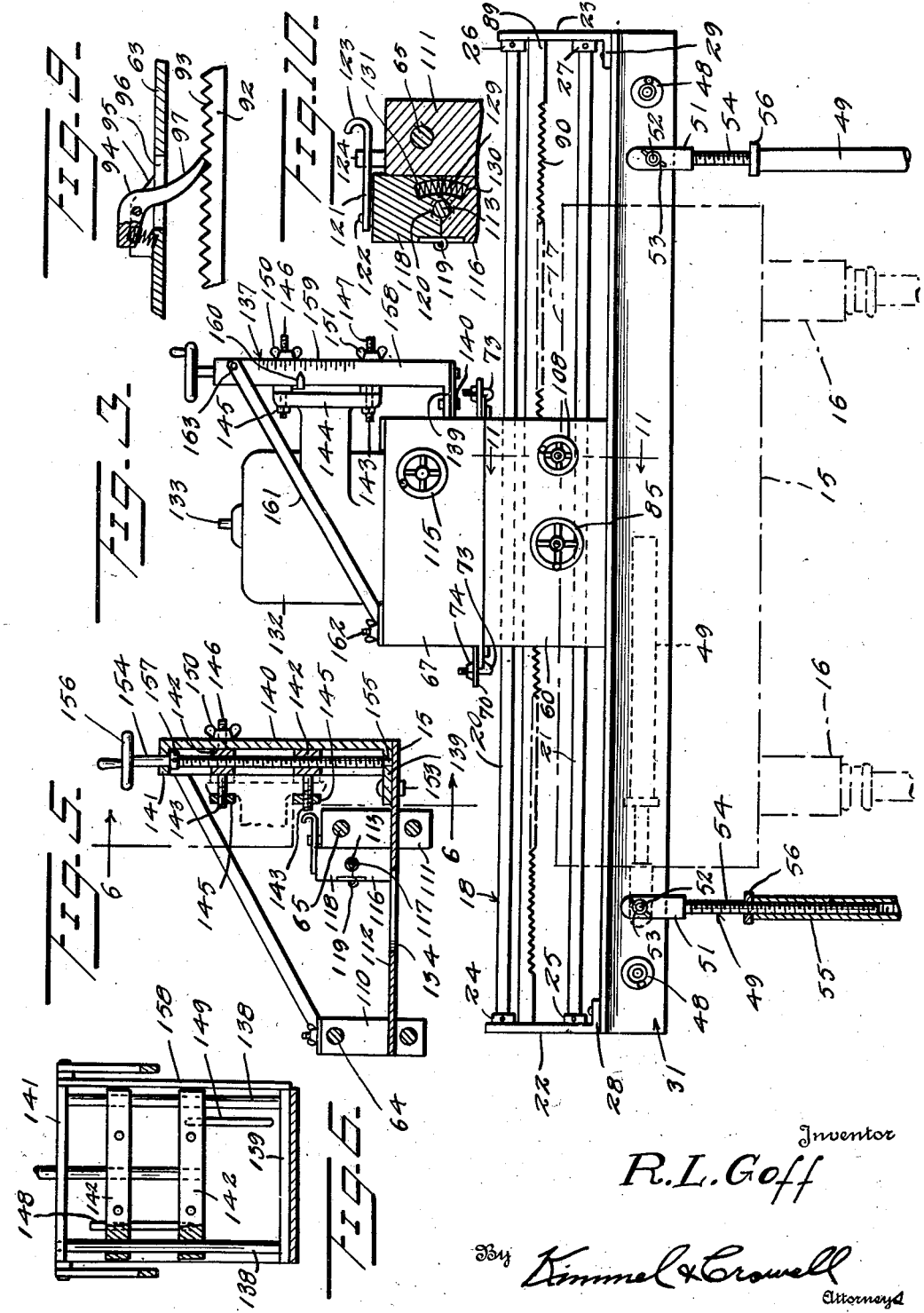

Patented Mar. 23, 1943

2,314,697

UNITED STATES PATENT OFFICE 2,314,697

MEAT CHOPPING BLOCK SMOOTHING MACHINE

Roland L. Goff, Yreka, Calif.

Application October 28, 1940, Serial No. 363,216

7 Claims. (Cl. 144—2)

This invention relates to a means for scraping and straightening the working face of a meat block.

An object of this invention is to provide a collapsible or knockdown scraper structure which is adapted to be secured to a meat chopping block for the purpose of smoothing or levelling the upper face of the block.

Another object of this invention is to provide a device of this kind including a motor operated scraper or cutter and detachable means for movably supporting the motor relative to the meat chopping block so that the block may be operated upon to the desired extent.

A further object of this invention is to provide a device of this kind which may readily be secured to different sizes of blocks.

A still further object of this invention is to provide a block smoothing structure including a horizontally shiftable carriage and a vertically shiftable carriage by means of which the top of the meat block may be smoothed to the desired extent.

A further object of this invention is to provide a manually shiftable cutter structure and an automatically releasable means to limit the shifting of the cutter structure in one direction.

To the above objects and to others which may hereinafter appear, the invention consists of the novel construction, combination and arrangement of parts as will be more specifically referred to and illustrated by the accompanying drawings wherein is shown an embodiment of the invention, but it is to be understood that changes, variations and modifications may be resorted to which fall within the scope of the invention as claimed.

In the drawings:

Figure 1 is a detail top plan of a meat chopping block smoothing structure constructed according to an embodiment of this invention.

Figure 2 is a detail side elevation of the device.

Figure 3 is a detail front elevation of the device.

Figure 4 is a fragmentary rear end elevation partly broken away and in section and partly exploded of the device.

Figure 5 is a sectional view taken on the line 5—5 of Figure 1.

Figure 6 is a sectional view taken on the line 6—6 of Figure 5.

Figure 7 is a fragmentary sectional view in partly exploded condition and taken on the line 7—7 of Figure 1.

Figure 8 is a sectional view taken on the line 8—8 of Figure 7.

Figure 9 is an enlarged fragmentary sectional view of the carriage holding dog.

Figure 10 is an enlarged fragmentary sectional view of one portion of the motor carriage showing the latching means for latching the carriage with the carriage operator.

Figure 11 is a sectional view taken on the line 11—11 of Figure 3.

Referring to the drawings, the numeral 15 designates generally a meat chopping block which is provided with supporting legs 16. The chopping block 15 is of conventional construction and as shown herein the block 15 is substantially equal in plane. After the block 15 has been used for a period of time the upper surface 17 thereof becomes uneven and it is in order to smooth or even the upper surface of the block 15 that the hereinafter described invention has been provided.

In order, therefore, to provide a surface smoothing means for smoothing the surface 17 of the block 15, I have provided a collapsible or knockdown structure, as will be hereinafter described, which may be detachably mounted on the block 15, the device being assembled about the block 15. The hereafter described smoothing machine is of such a construction that blocks of different sizes may be worked upon by the machine and the work may be performed at the particular point where the chopping block 15 is located.

On opposite sides of the block 15 there are adapted to be positioned, carriage guide members which are termed lower supporting structures and they are generally designated as 18 and 19. The guide member 18 comprises upper and lower guide rods or bars 20 and 21, respectively, which are secured in spaced apart parallel relation to a pair of end members 22 and 23. The end member 22 is provided on its inner side with a pair of bushings or bosses 24 and 25 within which the rods 20 and 21, respectively, are adapted to be secured. The end member 23 on its inner side is formed with upper and lower bosses or bushings 26 and 27 in which the opposite ends of the guide rods or bars 20 and 21, respectively, are adapted to be fixed. The lower end of the end member 22 is formed with an inwardly projecting foot or flange 28 and the lower end of the end member 23 is also formed with an inwardly projecting foot or flange 29. The flanges 28 and 29 engage on the upper side of a horizontal supporting flange 30 carried by a combined angle supporting and clamping member generally designated as 31. The supporting member 31 is provided with a dependent angle or side 32 which as shown in Figure 2 is adapted to engage against the adjacent side of the block 15.

The guide member 19 is constructed similar to the guide member 18 and comprises upper and lower guide rods or bars 33 and 34 which are secured to upstanding end members 35 and 36. The end members 35 and 36 are secured to the horizontal flange 37 of a combined guide supporting member and clamp generally designated as 38 which is similar to the clamp 31. The angle member or clamp 38 includes a vertical flange or side 39 which is adapted to engage the side of the block 15 opposite from the side engaged by the clamping member 31.

The clamping members 31 and 38 are adapted to be held in vertically adjusted position relative to the block 15 by means of a pair of flexible members 40 shown in Figure 1 which are constructed in the form of a chain, one end of which is engaged with a hook 41 carried by a threaded stem 42. The stem 42 engages through an opening 43 in the side 39 of the clamping member 38 and a nut or hand wheel 44 is threaded onto the stem 42 and engages against the outer side of the clamping jaw or member 38. A second hook 45 engages in a selected link of the chain 40 and is provided with a stem 46 engaging through an opening 47 formed in the side 32 of the clamping member 31. A hand wheel or pressure member 48 is threaded onto the stem 46 so that tightening of the hand wheel or nut 48 on the stem 46 will draw the two clamping members 31 and 38 into clamping engagement with the opposite sides of the chopping block 15. It will be understood that there are two of these chains 40 and also chain tightening members including two hand wheels 48 which are shown in Figure 3.

In order to provide a means whereby the guide members 18 and 19 may be vertically adjusted relative to the block 15 and prevented from vertical slipping relative to the block 15 either before or after the clamping members 31, 38 are tightened, I have provided a pair of adjustable leg members 49 which are pivotally carried by the clamping member 31 and a second pair of adjustable legs 50 which are carried by the clamping member 38. The details of construction of the legs 49 and 50 are identical and each leg comprises a head 51 which is pivotally mounted on a pivot member or bolt 52 carried by the side flange of a clamping member 31 or 38.

A nut 53 is threaded onto the bolt or pivot 52 and is adapted to hold the leg 49 in either a horizontal inoperative position parallel with the upper flange 30 as shown in dotted lines in Figure 3 or in a vertical operative position shown in full lines in Figures 2 and 3. A threaded stem or shaft 54 extends downwardly from the head 51 and is threaded into a tubular leg member 55. The leg member 55 is locked relative to the shaft 54 by means of a lock nut 56 which is threaded onto the shaft 54 and is adapted to engage against the upper end of the leg 55.

A carriage generally designated as 57 movably engages the guide members 18 and 19 and the carriage 57 includes a pair of forward slide members 58 which slidably engage the guide members 20 and 21 and a pair of rear slide members 59 which slidably engage the rear guide members or rods 33 and 34. The two forward slide members 58 are fixed to a front plate 60 and the rear slide members 59 are fixed to a rear plate 61. The plate 60 has secured to the upper edge thereof a rearwardly projecting plate 62 which may also be secured in any suitable manner to the upper ends of the forward guide members 58. The plate 62 projects rearwardly from the guide members 58 as shown in Figure 2, the purpose for which will be hereinafter described. The rear plate 61 has secured to the upper edge thereof a forwardly projecting plate 63 which is secured in any suitable manner to the upper ends of the rear slide members 59 and the plate 63 as shown in Figure 2 projects forwardly upon the forward edges of the slide members 59.

The carriage 57 also includes two pairs of spaced apart parallel guide members 64 and 65 which at their forward ends are secured to vertically disposed bars 66 which are fixed to an upper carriage plate 67. A vertically disposed brace or guide 68 is disposed rearwardly from each forward bar 66 and is connected at its upper end to the bar 66 by means of a connecting plate 69. The plate 67, the bars 66 and the lower ends of the guides or braces 68 are fixed to a base plate 70. The plate 70 extends rearwardly from the braces 68 and engages over the plate 62. The plate 62 is provided on the upper side thereof with a pair of upwardly projecting lugs or keys 71 which are engageable in keyways or recesses 72 formed in the plate 70. The plate 70 is fixed relative to the plate 62 by means of a pair of hooks or plate clamping members 73 which engage through the plate 70 and beneath the plate 62.

Each hook 73 has a thumb nut 74 threaded thereon so that the plate 70 may be detachably secured to the plate 62. The rear plate 61 has detachably mounted thereon a rear guide structure for the pairs of guide bars 64 and 65 which includes a pair of vertically disposed bars 75 which are secured to the forward side of a rear carriage plate 76. The guide bars 64 and 65 are slidable through the supporting bars 75 and plate 76 and are also slidable through a pair of forward guide members 77 which are fixed at their upper ends to a horizontal forwardly projecting plate 78. The plate 78 is fixed to the upper ends of the guide members 75 and the plate 76 by any suitable fastening means. The forward guide members 77 are secured at their lower ends to a base plate 79 which is also fixed to the lower ends of the guide members 75 and the rear plate 76. The base plate 79 is formed adjacent the forward edge thereof with a pair of recesses or keyways 80 within which keys 81 carried by the plate 63 are adapted to engage and the plate 79 is detachably secured to the plate 63 by means of a pair of hooks 82 formed with threaded stems 83. A thumb nut 84 is threaded onto a stem 83 so that the hooks 82 may be engaged beneath the plates 62 and in this manner the rear guide structure may be secured to the rear carriage structure including the plate 61 and the slide members 59.

The carriage 57 is adapted to be shifted lengthwise of the guide members 18 and 19 by means of a hand wheel 85 which is fixed to one end of a carriage adjusting shaft 86. The shaft 86 is journalled through a bearing 87 carried by the plate 60 and the rear end of the shaft 86 has mounted thereon a gear or pinion 88. A horizontally disposed toothed rack 89 is fixed between the two end members 22 and 23 and the gear or pinion 88 is in constant mesh with the teeth 90 of the rack bar 88. A rear rack bar 92 is secured between the rear end members 35 and 36 and is disposed with the teeth 93 thereof uppermost.

A spring pressed dog 94 is pivotally mounted between a pair of ears 95 and the dog 94 extends downwardly through an opening 96 provided in the top plate 63. The bill 97 of the dog 94 is adapted to engage the teeth 93 and is adapted to hold the rear carriage structure against sliding movement along the guide members 33 and 34 in one direction.

The carriage 57 may be releasably locked against movement relative to the guide members 18 and 19 by means of a clamping block 98 which is loosely disposed between the upper plate 62 and the horizontal flange 30 of the clamping member 31. A stationary clamping block 99 is secured to the front plate 60 and a threaded shaft 100 loosely engages through the stationary block 99 and is swivelly mounted as at 101 in the movable block 98. The movable block 98 is provided with a pair of semi-cylindrical recesses 102 and 103 within which the guide rods 20 and 21 respectively are adapted to engage. The stationary clamping block 99 is also provided with a pair of substantially semi-cylindrical recesses 104 and 105 confronting the recesses 102 and 103. The stationary block 99 may also be provided with a recess 106 within which the rack bar 89 is adapted to slidably engage. The clamping block 98 may be provided with a recess 107 confronting the recess 106 so that when the block 98 is pulled forwardly by means of a hand wheel or nut 108 which is threaded on the shaft 100, the clamping block 98 will tightly secure the guide members 20 and 21 with respect to the stationary block or jaw 99 and will also tightly hold the rack bar 98 with respect to the stationary jaw 99.

A second carriage generally designated as 109 is slidable on the pairs of guide bars or members 64 and 65. The carriage 109 is shiftable at right angles to the carriage 57 and to the guide members 18 and 19. The carriage 109 as shown in Figure 5 comprises pairs of slide members 110 and 111 which slidably engage the guide members 64 and 65, respectively. The slide members 110 and 111 are fixed to a horizontally disposed plate 112 which extends between the guide members 64 and 65 and at one edge projects laterally as shown in Figure 5.

The carriage 109 is shifted lengthwise of the guide members 64 and 65 by means of a threaded carriage shifting shaft 113 which is journalled in bearings 114 carried by the front plate 67. A hand wheel 115 is fixed to the forward end of the shaft 113 so that the shaft 113 may be manually rotated. The rear portion of the shaft 113 is also journalled through the rear plate 76. The carriage 109 has secured to the plate 112 thereof a slide block 116 which in its upper side is formed with a substantially semi-cylindrical recess 117 in which the shaft 113 loosely engages. A carriage shifting block 118 is pivotally secured as at 119 to the slide block 116. The block 118 on its lower face is formed with a threaded semi-cylindrical recess 120 in which the threads of the shaft 113 are adapted to engage so that when the block 118 is in latched position as shown in Figures 5 and 10 rotation of the shaft 113 will effect movement of the carriage 109 lengthwise of the guide members 64 and 65.

The pivoted block or nut member 118 is releasably locked in operative position for engagement with the shaft 113 by means of a pivoted latch member or bolt 121 mounted on a pivot 122 carried by the block 118. The latch member 121 at its free end is formed with a hook or projection 123 so that this latch member 121 may be manually shifted into engagement with a substantially L-shaped keeper 124 which is fixed to slide member 111 and projects upwardly therefrom. The latching bar or bolt 121 is adapted to be moved to an unlatched position upon movement of the carriage 109 toward the rear end member 76 by means of a releasing bar 125 which is formed with a longitudinal slot 126 through which a clamping bolt 127 engages.

The clamping bolt 127 has a clamping nut 128 threaded thereon so that the latch releasing member 125 may be adjusted to unlatch the latch member 121 at the desired position and thus stop rearward movement of the carriage 109. The nut member 118 is yieldably moved to a released position when the latch 121 is released from the keeper 124 by means of a spring 129 which engages in a socket 130 formed in the lower block 116 and in a socket or recess 131 formed in the upper block 118.

A power member 132 is carried by the carriage 109 and is constructed in the form of an electric motor which is disposed with the operating shaft 133 thereof vertical. The shaft 133 projects downwardly through the plate 112 through an opening 134 formed in the plate 112 and a block smoothing member or cutter 135 is fixed to the lower end of the shaft 133. The cutter member or block smoothing member 135 is of conventional construction being constructed in the form of a disc having cutting teeth on the lower surface 136 thereof. The opening 134 in the plate 112 is of sufficient size as to permit the cutter 135 to freely engage therein when the motor 132 is adjusted relative to the plate 112 or when the motor 132 is vertically withdrawn from the carriage 109.

The motor 132 is fixed to an elevator structure generally designated as 137. The elevator structure 137 comprises a pair of vertically disposed guide members 138 in the form of round guide rods which are secured at their lower ends to a lower flange 139 carried by a plate 140. The upper ends of the guide members 138 are secured in an upper right angle flange 141 carried by the upper end of the plate 140. A pair of slide bars 142 are slidable on the guide members 138 and each slide bar 142 has secured thereto a pair of threaded studs 143 which are adapted to engage through the base 144 of the motor 132. Lock nuts 145 are threaded on the studs 143 so as to fixedly secure the motor 132 on the slide members 142. The slide members 142 are locked in their vertically adjusted position by means of a pair of threaded members or studs 146 and 147 which are carried by the slide members 142 in spaced apart relation.

The stud 146 is slidable in an elongated slot 148 formed in the plate 140 and the stud 147 is slidable in an elongated slot 149 also formed in the plate 140. Wing nuts 150 and 151 are threaded onto the studs 146 and 147, respectively.

The base flange 139 of the plate 140 is secured to an extension 152 formed with the plate 112 by fastening devices 153. The slide rods or members 142 are vertically adjusted so as to vertically adjust the motor 132 and the cutter 135 by means of a screw shaft 154 which at its lower end is rotatably mounted in the flange 139 as at 155. The upper end of the shaft 154 is provided with a hand wheel 156 and the shaft 154 is held against endwise movement relative to the flange 141 through which the shaft 154 rotatably engages by means of a collar 157 which is fixed to the shaft 154 below the flange 141. The position of the cutter 135 may be determined by a gauge device including a vertically disposed plate 158 which is secured along one edge of the plate 140 between the flanges 141 and the base flange 139. The plate 158 as shown in Figure 3 is provided with graduations 159 and the uppermost slide member 142 is provided with a laterally projecting pointer 160 which is adapted to overlap the plate 158.

The elevator structure hereinbefore described is preferably braced by means of a pair of bracing bars 161 which are secured by means of thumb bolts 162 to the slide members 110. The upper ends of the bracing bars 161 are secured by fastening devices 163 to the upper portion of the elevator structure.

In the use and operation of this meat chopping block smoothing machine the device is secured to opposite sides of the block 15 by the clamping members 31 and 38 which are tightened by means of the hand wheels or nuts 48 which tighten the chains 30. The height of the clamping members 31 and 38 may be adjusted through the vertically adjustable supporting legs 49 and 50. After the carriage 57 has been secured to the plates 62 and 63, the cutter 135 may be vertically adjusted through the elevator screw 154. With the cutter 135 in initially adjusted position, the elevator may be locked by means of the elevator locking nuts 150 and 151. The carriage 57 may also be locked relative to the block 15 by means of the clamping structure including the clamping members 98 and 99 and the pressure wheel or rod 108. The screw shaft 113 may then be rotated to shift the cutter carriage 109 lengthwise of the guide members 64 and 65. When the carriage 109 reaches the opposite side of the block 15, the releasing member 125 will engage the latch 121 so as to release this latch from the keeper 124 and permit the spring 129 to swing the threaded block 118 out of engagement with the screw 113. The carriage 109 may then be moved in its released position from the shaft 113 toward the front of the device and the carriage 57 may be shifted again by release of the clamping members 98 and 99 and by release of the spring pressed dog 94 from the rack bar 92.

A smoothing machine constructed according to this invention can be clamped to any size chopping block and the surface of the block may be smoothed to the desired extent through the adjustable cutter 135. This device is of such a construction that it may be assembled at the point of the location of the chopping block 15 so that it will not be necessary for the user of the block 15 to move the block 15 from the place of use of the block in order to have the surface of the block smooth to the desired extent.

What I claim is:

1. A meat chopping block smoothing means, comprising a horizontally shiftable carriage, means supporting said carriage for movement relative to the block, means detachably mounting said supporting means on opposite sides of the block, said supporting means comprising pairs of elongated guide rods and an elongated toothed rack, a manually operable toothed shifting member carried by said carriage and engaging said rack, said carriage including a pair of end members slidably engaging said guide rods, guide members fixed to said end members and disposed at right angles to said guide rods, a second carriage slidably engaging said guide members, a threaded shaft carried by said first carriage, a threaded nut for engagement with said shaft, means pivotally supporting said nut from said second carriage, spring-pressed latching means carried by said second carriage for holding said nut in operative position, means carried by said first carriage engageable with said latching means for releasing said nut from said shaft when said second carriage reaches a predetermined point in its movement relative to said guide members, a vertically shiftable elevator carried by said second carriage, and cutter means carried by said elevator.

2. A machine for smoothing meat chopping blocks comprising a cutter, means for supporting said cutter in vertically adjustable relationship with respect to said block, means for horizontally adjusting said cutter, means for horizontally adjusting said cutter at right angles to said first named horizontal adjusting means, said first named horizontal adjusting means including a screw threaded shaft and a pivoted nut engaging said shaft and secured to said first named cutter support means, means constantly urging said nut to a disengaged position, a latch on said nut holding said nut in engagement with said shaft, and means secured to said first named horizontal adjusting means for unlatching said nut whereby the latter disengages from said shaft when said cutter has moved a pre-determined distance horizontally in one direction.

3. A machine for smoothing meat chopping blocks comprising a cutter, means for supporting said cutter in vertically adjustable relationship with respect to said block, means for horizontally adjusting said cutter, means for horizontally adjusting said cutter at right angles to said first named horizontal adjusting means, said first named horizontal adjusting means including a screw threaded shaft and a pivoted nut engaging said shaft and secured to said first named cutter support means, means constantly urging said nut to a disengaged position, releasable latch means for holding said nut in a shaft engageable position, and means secured to said first named horizontal adjusting means for engaging said latch, whereby said latch is moved to an unlatched position when said cutter has moved a predetermined distance horizontally.

4. A machine for smoothing meat chopping blocks comprising a cutter, means for supporting said cutter in vertically adjustable relationship with respect to said block, means for horizontally adjusting said cutter including a screw threaded shaft and a pivoted nut engaging said shaft and secured to said first named cutter support, means constantly urging said nut to a disengaged position, a latch on said nut holding said nut in engagement with said shaft, means adjacent one end of said horizontal adjusting means for unlatching said nut whereby the latter disengages from said shaft when said cutter is moved a pre-determined distance horizontally in one direction.

5. A machine for smoothing meat chopping blocks comprising a cutter, means for supporting said cutter in vertically adjustable relationship with respect to said block, means for horizontally adjusting said cutter including a screw threaded shaft and a pivoted nut engaging said shaft and secured to said first named cutter support means, means constantly urging said nut to a disengaged position, releasable latch means for holding said nut in shaft engaging position, and adjustable means adjacent one end of said horizontal adjusting means for engaging said latch whereby it is moved to an unlatched position when said cutter has moved a predetermined distance horizontally in one direction.

6. A machine for smoothing meat chopping blocks comprising a pair of guide members, means detachably securing said members on opposite sides of the block, a carriage movably engaging said members, said carriage including guide means engageable over the top of the block, a second carriage movable on said guide means, a smoothing construction carried by said second carriage, means for moving said second carriage lengthwise of said guide members, and correlated means carried by said first and second carriages for disengaging said second carriage from said moving means when said carriage has moved a predetermined distance in at least one direction.

7. A machine for smoothing meat chopping blocks comprising a pair of guide members, means detachably securing said members on opposite sides of the block, a carriage movably engaging said members, said carriage including guide means engageable over the top of the block, a second carriage movable on said guide means, a smoothing construction carried by said second carriage, means for moving said second carriage lengthwise of said guide members, and correlated means carried by said first and second carriages for disengaging said second carriage from said moving means when said carriage has moved a predetermined distance in at least one direction, said correlated means including a pivoted nut element carried by said second carriage, means holding said nut element in contact with said moving means, spring means urging said nut element to disengaged position, and means fixed relative to said first carriage engageable with said holding means to shift the latter to disengaged position when said second carriage has moved a predetermined distance in one direction.

ROLAND L. GOFF.